June 24, 1958 L. W. SCHMIDT 2,840,173
TOPPING UNIT FOR SUGAR BEET HARVESTERS
Filed April 9, 1957 3 Sheets-Sheet 1

INVENTOR.
Lewis W. Schmidt
BY Webster & Webster
ATTYS.

June 24, 1958  L. W. SCHMIDT  2,840,173
TOPPING UNIT FOR SUGAR BEET HARVESTERS
Filed April 9, 1957  3 Sheets-Sheet 3

INVENTOR.
Lewis W. Schmidt
BY
Webster & Webster
ATTYS.

2,840,173
TOPPING UNIT FOR SUGAR BEET HARVESTERS

Lewis Wallace Schmidt, Rio Vista, Calif.

Application April 9, 1957, Serial No. 651,675

12 Claims. (Cl. 171—37)

The present invention relates to an improved topping unit for a sugar beet harvester of the type shown in United States Patent No. 2,535,960.

With advance of the harvester, the beets are impaled at the ground on a spiked, beet pick-up wheel and are then carried by the wheel to an inverted position at the top thereof and at which point a topping unit severs the beets at the crown; the crown and attached foliage remaining on the wheel spikes for subsequent removal and disposal, while the topped beets deliver into an adjacent conveyor.

A major object of the invention is to construct and mount the beet topping unit in a manner such that the included cooperating cutting discs and related unitary assembly can float upwardly from a pre-set position to compensate for, and relieve, any jamming of heavy foliage, clods, or debris which may occur between the adjacent face of the spiked, beet pick-up wheel and said discs, and which might otherwise cause damage to the structure, or at least require that the harvester be stopped and the jam manually removed.

Another important object of the invention is to provide a topping unit which is readily adjustable to change the spacing from, or the working position of said included cooperating cutting discs relative to, such adjacent face of the spiked, beet pick-up wheel; said adjustment being accomplished through the medium of a single, conveniently accessible hand actuated member.

It is also an object of the invention to provide a topping unit which is designed for economical manufacture, positive operation, and long service with a minimum of maintenance or repair being required.

An additional object of the invention is to provide a practical and reliable topping unit for sugar beet harvesters.

These objects are accomplished by means of such structure and relative arrangement of parts as will fully appear by a perusal of the following specification and claims.

In the drawings:

Fig. 4 is a fragmentary transverse elevation on line 4—4 of Fig. 3.

Fig. 5 is a fragmentary sectional plan view taken on line 5—5 of Fig. 1.

Referring now more particularly to the drawings, and to the characters of reference marked thereon, the topping unit, which embodies the present invention, is shown generally at 1, and is mounted in connection with a beet harvester which includes a tractor-mounted, longitudinally extending frame 2 having a spiked, beet pick-up wheel 3 journaled therein; i. e., between opposite sides of said frame.

Figure 1:
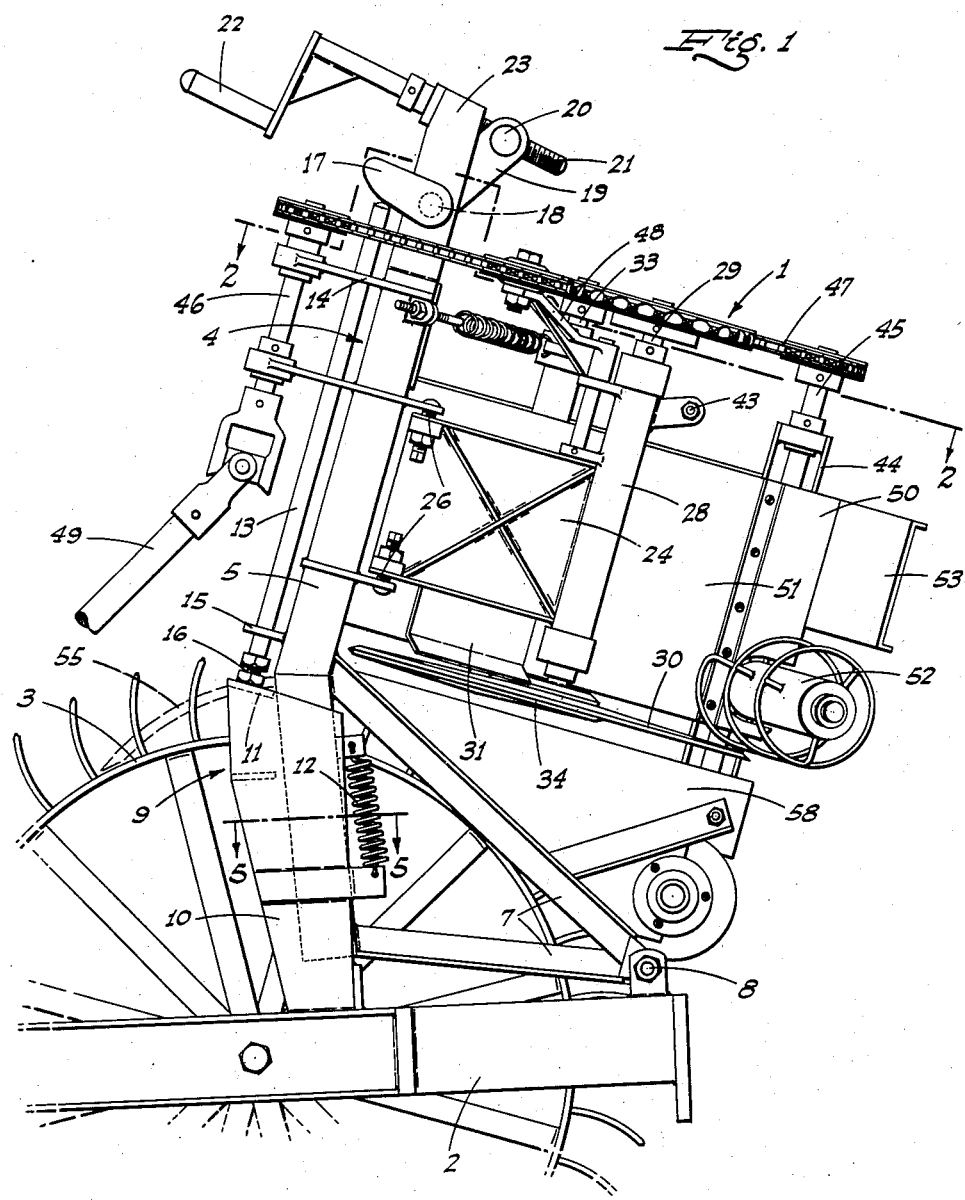
Fig. 1 is a side elevation of the topping unit as adjusted to a working position.
Figure 3:
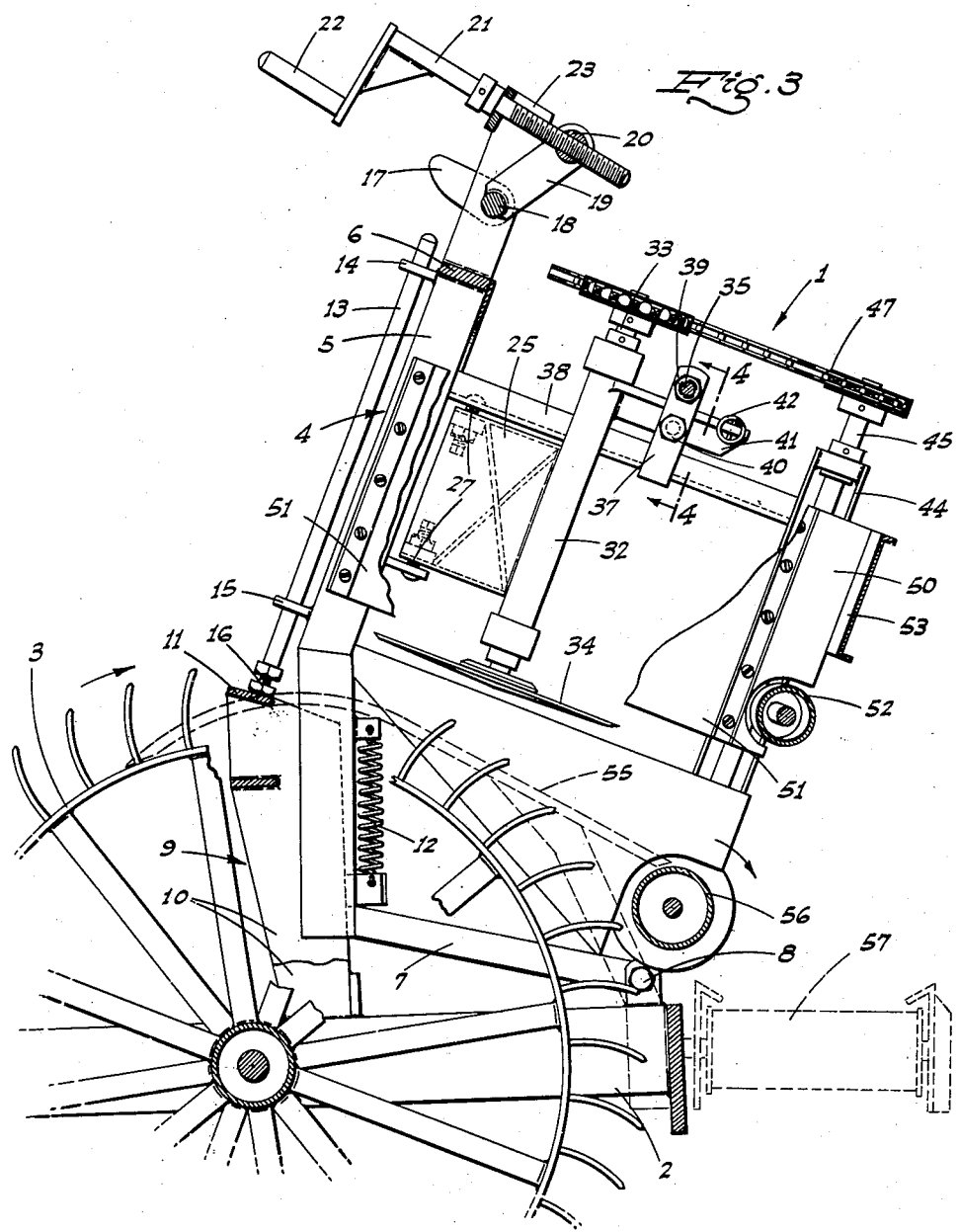
Fig. 3 is a sectional elevation taken on line 3—3 of Fig. 2, but shows the topping unit in the position which it would occupy after floating upwardly in response to a jam between the spiked, beet pick-up wheel and the cutting discs.

The spiked, beet pick-up wheel turns in the direction indicated by the arrows in Figs. 1 and 3, and with advance of the tractor—in straddling relation to a beet row—the wheel rides such row, impales the beets, and then lifts them to the top of the wheel, where said beets occupy an inverted position. It is while the beets are in such inverted position that the topping unit 1 comes into play; such topping unit being constructed and functioning in the following manner.

An inverted, substantially U-shaped frame, indicated generally at 4, straddles—and extends a substantial distance above—the spiked, beet pick-up wheel 3 adjacent the top thereof; such frame 4 including transversely spaced posts 5 rigidly secured together by a top cross bar 6.

The lower end portions of the posts 5 are fixed in connection with forwardly converging attachment arms 7 which are pivoted, as at 8, in connection with the adjacent sides of the longitudinal frame 2. As so mounted, the inverted, substantially U-shaped frame 4 is movable about the pivots 8 as an axis.

The lower portions of the posts 5—in addition to being fixed to the arms 7—are vertically movably disposed in guides 9 which upstand in rigid relation from the sides of the longitudinal frame 2; each such guide including transversely spaced side plates 10 connected together by means which includes a top cross bar 11 which serves an additional purpose, as will hereinafter appear.

A tension spring 12 is connected between each guide 9 and the related post 5 at a higher point on the latter, whereby to yieldably urge the inverted substantially U-shaped frame 4 in a downward direction.

The frame 4—and the cooperating mechanism mounted thereon, as hereinafter described—is selectively limited in its lowering movement by the following adjustable arrangement:

Each of the posts 5 is fitted—at the front, and above the related guide 9—with a stop rod 13 slidably carried in vertically spaced ears 14 and 15. Below the ear 15 each stop rod 13 is provided with an adjustable foot 16 which normally rests on the adjacent top cross bar 11 of said related guide 9.

At the upper end each stop rod 13 is normally engaged by a cam 17 which radiates from a cross shaft 18 suitably journaled in connection with, but disposed above, the top cross bar 6. The cross shaft 18 is fitted—at one point in the length thereof—with short radial arms 19 having a nut 20 turnably mounted between the outer ends thereof; such nut receiving—in threaded relation—the shaft 21 of a hand crank 22 suitably mounted in connection with the upper end of a bracket 23 which upstands from the top cross bar 6.

By rotating the hand crank 22 in one direction or the other the cross shaft 18 is correspondingly turned, whereby to raise or lower the cams 17, resulting in lowering or raising—respectively—of the inverted, substantially U-shaped frame 4, which carries the following beet topping mechanism:

Above the spiked, beet pick-up wheel, but below the top cross bar 6, the posts 5 are fitted with forwardly projecting attachment plates, indicated at 24 and 25; the attachment plate 24 being pivoted, as at 26, for lateral swinging motion in a plane at right angles to the related post 5, while the attachment plate 25 is pivoted—as at 27—for like swinging motion in relation to its post 5.

The attachment plate 24 is rigidly secured at its free end to an upstanding sleeve 28 having a shaft 29 journaled therein; the shaft 29 projecting both above and below the sleeve 28. Below the sleeve 28 the shaft 29 is fitted with a relatively large-diameter topping disc 30;

there being a disc cleaner or scraper 31 on—and depending from—the plate 24 in cooperating relation to said disc 30.

The attachment plate 25 is similarly provided with an upstanding sleeve 32 in which a shaft 33 is journaled; said shaft 33 projecting both above and below the sleeve 32, and at the lower end is fitted with a relatively smaller topping disc 34 which laps and runs in cooperation with the adjacent portion of the topping disc 30.

An adjustable length stop rod 35 is pivoted, as at 36, to the sleeve 28, and thence extends transversely inwardly through the upper portion of an L-shaped bracket 37 fixed at its other end to a top longitudinal bar 38 which extends forwardly in rigid relation from the upper end of the related post 5.

The stop rod 35 includes a stop shoulder 39 which abuts the upper portion of the bracket 37 on the inner side. Below the stop rod 35 and its stop shoulder 39 the upstanding portion of the bracket 37 has an adjustment screw 40 threaded therethrough from the inner side, and such adjustment screw bears against a finger 41 which projects forwardly in rigid relation from the top part of the sleeve 32.

By adjusting the rod 35 and the screw 40, the spacing between the shafts 29 and 33, and consequently the extent of overlap of the discs 30 and 34, can be readily and selectively set.

In order to permit the discs 30 and 34 to yield laterally outwardly—or to relatively move apart under a heavy load, or when a piece of debris is engaged—a tension spring 42 is connected between the free end of the finger 41 and an adjustable bolt 43 which extends laterally inwardly from the top portion of the sleeve 28. With such yielding of the discs the parts of the stop assembly above described can move from their full line positions to their dotted line positions, as in Fig. 4.

Figure 2:
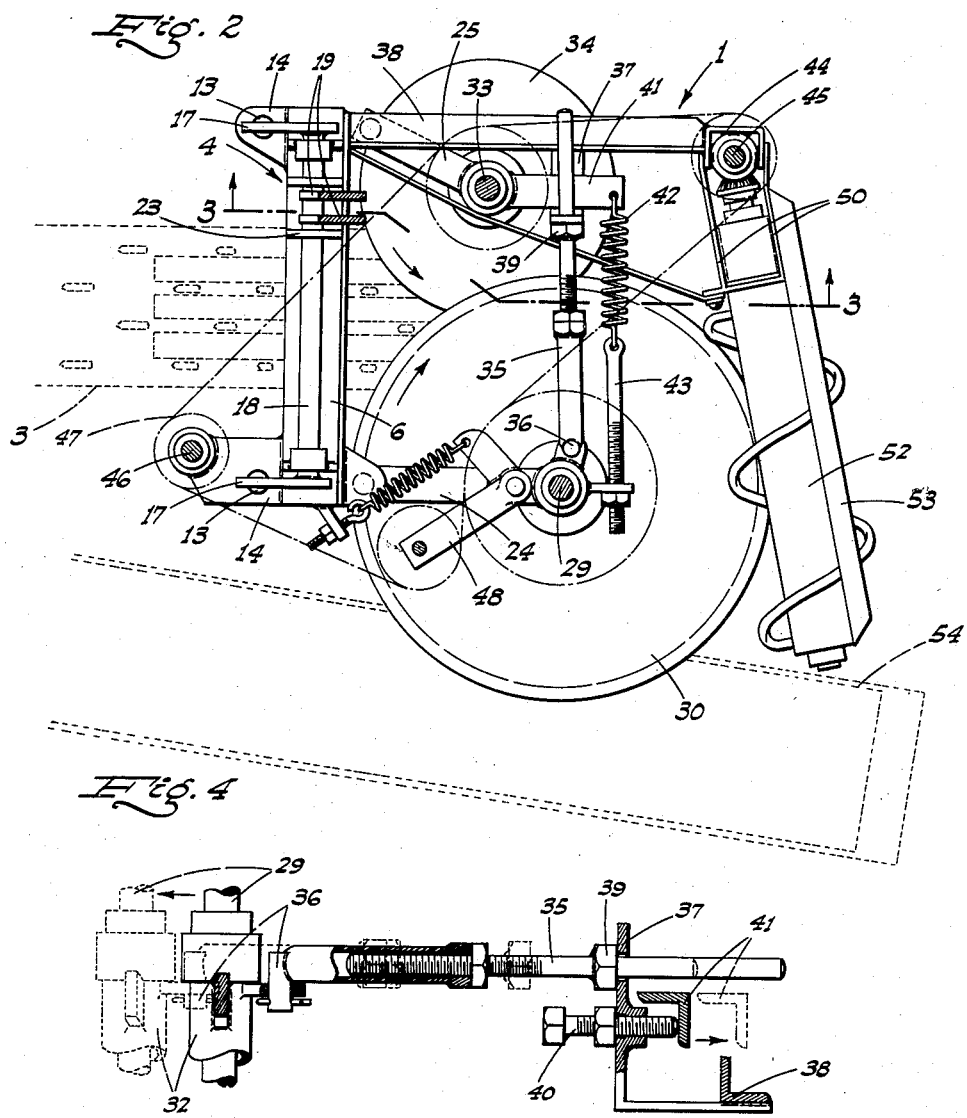
Fig. 2 is a sectional plan view taken on line 2—2 of Fig. 1.

The shafts 29 and 33 are driven, so as to rotate the discs 30 and 34 in the direction indicated by the arrows in Fig. 2, as follows:

At the forward end thereof the top longitudinal bar 38 is fixed in connection with an upstanding post 44 in which an idler shaft 45 is journaled, while a driven shaft 46 is mounted in connection with one of the posts 5. The shafts 29 and 33, together with idler shaft 45, are driven from the shaft 46 by an endless chain and sprocket unit, indicated generally at 47, but which unit includes— as shown—a sprocket on each shaft, with the chain following the course indicated by the broken lines in Fig. 2. Additionally, a spring-urged tightener 48 cooperates with the chain.

The shaft 46 has power imparted thereto by any suitable means, here shown as a universal drive shaft 49 actuated from a tractor driven shaft (not shown).

The post 44 has a laterally inwardly projecting extension 50 thereon; said extension terminating at its inner end adjacent but short of the periphery of the topping disc 30. A flexible, beet deflecting curtain or shield 51, preferably of heavy-duty sheet rubber, connects between the inner end of the post extension 50 and the related post 5; such curtain extending at a rearward and outward incline in overlying relation to the disc 34.

A beet deflecting auger 52 is journaled at its inner end in connection with the post 44, and is driven from the shaft 45; such auger 42 extending laterally above—but in cooperative relation to—the forward portion of the topping disc 30; there being a deflector plate 53 extending above the auger 52 lengthwise thereof, and such plate being mounted in connection with the post extension 50, as shown.

The topping unit is shown in a normal working position in Fig. 1, and in this position the inverted beets (not shown), as they reach the top of the spiked, beet pick-up wheel 3, are severed at the crown by the topping discs 30 and 34. The cut beets then ride the top of said discs, being deflected by the curtain 51 onto the disc 30, and finally discharge from the periphery of the latter at an outside point, and which discharge is aided by the auger 52. From the topping disc 30 the cut beets fall onto a carry-off conveyor 54 which is included in the harvester.

Beet crowns, together with the foliage, which remain impaled on the spiked, beet pick-up wheel 3 pass beneath the cutting discs 30 and 34 and are there stripped off said spikes by a series of stripper bars 55 which upstand from the front end of the frame 2 and thence extend rearwardly in cooperating relation with the face of the wheel 3 between the rows of spikes. As such tops and foliage are stripped from the wheel they pass over a driven roller 56 and thence fall onto a cross conveyor 57 mounted on the front of said frame 2.

The roller 56 is driven, in suitable fashion, from the lower end of the shaft 45, and is journaled in connection with side shields 58 carried by the longitudinally extending attachment arms 7.

As previously described, the working position of the topping discs 30 and 34 is adjustable relative to the face of the spiked, beet pick-up wheel 3 by the simple expedient of manipulating the hand crank 22, but in any position of adjustment said discs—and in fact the entire topping unit 1—can yield upwardly about pivots 8 as an axis, and against the tension of springs 12, in the event that a jam occurs between said discs and such wheel face. This permits the jam to pass, and eliminates the necessity of stopping the machine and manually removing the material which caused the jam. After any such jam has passed, the topping unit returns—of itself—to a working position with the topping discs 30 and 34 as initially set.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A topping unit, for a beet harvester which includes a spiked, beet pick-up wheel, and a secondary frame on which the wheel is journaled; said unit comprising an upstanding frame, means mounting the upstanding frame in connection with the secondary frame for free up and down motion relative to the wheel, stop means operative to limit downward motion of the upstanding frame to a lowered position, and beet topping mechanism mounted on the upstanding frame adapted to cooperate with the wheel adjacent the top thereof when the upstanding frame is in said lowered position.

2. A topping unit, as in claim 1, including means between the secondary frame and upstanding frame yieldably resisting upward motion of the latter.

3. A topping unit, as in claim 1, in which said stop means is adjustable to change said lowered position of the upstanding frame.

4. A topping unit, as in claim 1, in which the upstanding frame straddles the wheel from above, the secondary frame having members on opposite sides of the wheel, and said mounting means including longitudinal arms rigid with the upstanding frame on opposite sides and extending adjacent corresponding members, and pivotal connections between the arms and said members.

5. A topping unit, for a beet harvester which includes a spiked, beet pick-up wheel journaled on a support, comprising an upstanding frame, means mounting the frame in connection with the support for up and down motion relative to the wheel, stop means operative to limit downward motion of the frame to a lowered position, and beet topping mechanism mounted on the frame adapted to cooperate with the wheel adjacent the top thereof when the frame is in said lowered position; the upstanding frame being of inverted generally U-shape and straddling the wheel, the support having members on opposite sides of the wheel; said mounting means including longitudinal arms rigid with the frame on opposite sides and extending adjacent corresponding members, pivotal connections between the arms and said members, and guides upstanding from said members in cooperating relation to corresponding portions of said frame; the stop means being included in part in at least one of said guides.

6. A topping unit, for a beet harvester which includes a spiked, beet pick-up wheel, and a secondary frame on which the wheel is journaled; said unit comprising a frame structure straddling the wheel from above, means mounting the upstanding frame in connection with the secondary frame for up and down motion relative to the wheel, adjustable stop means operative to limit downward motion of the upstanding frame to a selected position but permitting of free upward motion thereof, and beet topping mechanism mounted on the upstanding frame adapted to cooperate with the wheel adjacent the top thereof when the upstanding frame is in said selected position.

7. A topping unit, for a beet harvester which includes a spiked, beet pick-up wheel journaled on a support, comprising a frame structure straddling the wheel from above, means mounting the frame in connection with the support for up and down motion relative to the wheel, adjustable stop means operative to limit downward motion of the frame to a selected position but permitting of free upward motion thereof, and beet topping mechanism mounted on the frame adapted to cooperate with the wheel adjacent the top thereof when the frame is in said selected position; said stop means including an upstanding rod slidably mounted on the frame to one side of the wheel, one stop element on the support normally engaged by the lower end of the rod, and another stop element on the frame normally engaging the upper end of the rod; said other stop element being adjustable up and down.

8. A topping unit, for a beet harvester which includes a spiked, beet pick-up wheel, and a secondary frame on which the wheel is journaled; said unit comprising an inverted generally U-shaped upstanding frame straddling the wheel, means mounting the upstanding frame on the secondary frame for up and down motion relative to the wheel, the secondary frame having members on opposite sides of the wheel, guides secured on and upstanding from said members, the corresponding lower end portions of the upstanding frame being received in said guides, adjustable stop means operative to limit downward motion of the upstanding frame to a selected position but permitting of free upward motion thereof, and beet topping mechanism mounted on the upstanding frame adapted to cooperate with the wheel adjacent the top thereof when the upstanding frame is in said selected position.

9. A topping unit, for a beet harvester which includes a spiked, beet pick-up wheel journaled on a support, comprising an inverted generally U-shaped frame straddling the wheel, means mounting the frame in connection with the support for up and down motion relative to the wheel, the support having members on opposite sides of the wheel, guides secured on and upstanding from said members, the corresponding lower end portions of the frame being received in said guides, adjustable stop means operative to limit downward motion of the frame to a selected position but permitting of free upward motion thereof, and beet topping mechanism mounted on the frame adapted to cooperate with the wheel adjacent the top thereof when the frame is in said selected position; said stop means including an upstanding rod slidably mounted on each side of the frame, each guide having an upwardly facing abutment normally engaged by the lower end of the related rod, the frame including a cross bar above the wheel, a transverse shaft journaled on the cross bar, radial cams on the transverse shaft normally bearing on the upper end of corresponding rods, and manually actuated means operative to adjustably maintain the transverse shaft in a selected rotative position.

10. A topping unit, for a beet harvester which includes a spiked, beet pick-up wheel, and a secondary frame on which the wheel is journaled; said unit comprising an inverted generally U-shaped upstanding frame straddling the wheel, the secondary frame including longitudinal members on opposite sides of the wheel, longitudinal arms fixed to opposite sides of the upstanding frame at the lower portions thereof, pivotal connections between said arms and members whereby to mount the upstanding frame in connection with the support for up and down motion relative to the wheel, adjustable stop means operative to limit downward motion of the upstanding frame to a selected position but permitting of free upward motion thereof from said position, and beet topping mechanism mounted on the upstanding frame adapted to cooperate with the wheel adjacent the top thereof when the upstanding frame is in said selected position.

11. A topping unit, for a beet harvester which includes a spiked, beet pick-up wheel journaled on a support, comprising an inverted generally U-shaped frame straddling the wheel, the support including longitudinal members on opposite sides of the wheel, longitudinal arms fixed to opposite sides of the frame at the lower portions thereof, pivotal connections between said arms and members whereby to mount the frame in connection with the support for up and down motion relative to the wheel, adjustable stop means operative to limit downward motion of the frame to a selected position but permitting of free upward motion thereof from said position, beet topping mechanism mounted on the frame adapted to cooperate with the wheel adjacent the top thereof when the frame is in said selected position, and rigid guides upstanding from the longitudinal members and receiving said lower portions of the frame; said stop means including upstanding rods slidably mounted on opposite sides of the frame, the guides having upwardly facing abutments which the lower ends of the rods normally engage, adjustable stop elements on the frame normally engaging the upper ends of the rods, and means to simultaneously adjust said stop elements up or down.

12. A topping unit, for a beet harvester which includes a spiked, beet pick-up wheel, and a secondary frame on which the wheel is journaled; said unit comprising an upstanding frame, means mounting the upstanding frame on the secondary frame for free up and down motion relative to the wheel, an upstanding guide on the secondary frame receiving a corresponding portion of the upstanding frame, stop means operative to limit downward motion of the upstanding frame to a lowered position, spring means between the guide and upstanding frame yieldably resisting upward motion of the latter, and beet topping mechanism mounted on the upstanding frame adapted to cooperate with the wheel adjacent the top thereof when the upstanding frame is in said lowered position.

References Cited in the file of this patent

UNITED STATES PATENTS

| | | |
|---|---|---|
| 1,503,625 | Beale | Aug. 5, 1924 |
| 2,535,960 | Schmidt | Dec. 26, 1950 |
| 2,637,155 | Schmidt et al. | May 5, 1953 |
| 2,710,513 | Schmidt | June 14, 1955 |